(12) United States Patent
Wiss et al.

(10) Patent No.: US 7,397,871 B2
(45) Date of Patent: Jul. 8, 2008

(54) ESTIMATION OF SINGLE-TO-NOISE RATIO BY PROCESSING MEASURED ERROR VECTOR MAGNITUDE

(75) Inventors: John Robert Wiss, Carlsbad, CA (US); Timothy Lyle Blalock, Encinitas, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 684 days.

(21) Appl. No.: 10/956,292

(22) Filed: Oct. 1, 2004

(65) Prior Publication Data

US 2006/0072656 A1    Apr. 6, 2006

(51) Int. Cl.
*H04B 3/46* (2006.01)
(52) U.S. Cl. ............... 375/340; 375/341; 375/346; 375/227
(58) Field of Classification Search ............... 375/222, 375/226, 346, 219, 324, 316, 341
See application file for complete search history.

(56) References Cited

U.S. PATENT DOCUMENTS

| | | | |
|---|---|---|---|
| 6,504,863 B1 | 1/2003 | Hellmark | |
| 6,690,746 B1 | 2/2004 | Sills et al. | |
| 6,690,747 B2 | 2/2004 | Petrus et al. | |
| 6,757,522 B1 | 6/2004 | Naegeli et al. | |
| 7,016,401 B1 * | 3/2006 | Smith et al. | 375/222 |
| 2002/0069038 A1 | 6/2002 | Cooper | |
| 2004/0137856 A1 | 7/2004 | Kanazawa et al. | |

OTHER PUBLICATIONS

Shin, et al., "Simple SNR Estimation Methods for QPSK Modulated Short Bursts", Proc. IEEE Global Telecommunications Conf., Globecom 2001, San Antonio, vol. 6, 2001 pp. 3644-3647.
Matzner, et al., "Analysis and Design of a Blind Statistical SNR Estimator", presented at AES Audio Engineering Society, 102nd Convention, Munich, Mar. 1997.

(Continued)

*Primary Examiner*—Chieh M. Fan
*Assistant Examiner*—Jaison Joseph
(74) *Attorney, Agent, or Firm*—Edward W. Callan

(57) ABSTRACT

The signal-to-noise ratio of a demodulated received signal is estimated by measuring the error vector magnitude (EVM) of the demodulated signal; and processing the measured EVM in combination with a correction term to estimate the signal-to-noise ratio of the demodulated signal. The correction term is a polynomial function of the measured EVM. The signal-to-noise ratio is estimated in accordance with the formula:

$$\frac{E_S}{N_0} \cong 10 \cdot \text{LOG}_{10}\left(\frac{\pi \cdot \lceil E_S \rceil}{4[\hat{\mu}_z + C(\hat{\mu}_z)]^2}\right) \text{ (dB)}$$

wherein $\hat{\mu}_z$ is the measured EVM based on the mean of a Rayleigh density of EVM measurements; and C is the correction term.
For QPSK modulated signals, C is calculated in accordance with the formula:

$C_{QPSK}(\hat{\mu}_z) \cong 2.71 \times 10^{-3}\hat{\mu}_z^3 - 7.54 \times 10^{-2}\hat{\mu}_z^2 + 0.7\hat{\mu}_z - 2.25$.
For BPSK modulated signals, C is calculated in accordance with the formula:

$C_{BPSK}(\hat{\mu}_z) \cong 1.78 \times 10^{-4}\hat{\mu}_z^3 - 1.03 \times 10^{-3}\hat{\mu}_z^2 + 4.62 \times 10^{-2}\hat{\mu}_z - 0.588$.

24 Claims, 5 Drawing Sheets

OTHER PUBLICATIONS

Matzner, "An SNR Estimation Algorithm for Complex Baseband Signals Using Higher Order Statistics", Facta Universitatis (Nis),vol. 6, No. 1, 1993, pp. 41-52.

Pauluzzi, et al., "A Comparison of SNR Estimation Techniques for the AWGN Channel", IEEE Transactions on Communications, vol. 48, No. 10, Oct. 2000, pp. 1681-1691.

"High-Speed Measurement of Digital Wireless System SNR by Means of Error Vector Magnitude Analysis", Wireless Conference 1996, Boulder, CO.

Spirent Communications, "Error Vector Magnitude", Application Note 71, 2003.

Agligent Technologies, "Using Error Vector Magnitude Measurements to Analyze and Troubleshoot Vector-Modulated Signals" Product Note PN 89400-14.

* cited by examiner

ESTIMATION OF SINGLE-TO-NOISE RATIO BY PROCESSING MEASURED ERROR VECTOR MAGNITUDE

BACKGROUND OF THE INVENTION

The present invention generally pertains to communication signal processing and is particularly directed to estimating the signal-to-noise ratio (SNR) of a received modulated signal by processing the measured error vector magnitude (EVM).

The EVM is a measure of the tightness of a received signal constellation about a desired constellation point and is thereby an indication of signal fidelity. Many commercial standards require compliance to an EVM requirement since the EVM is much more straightforward to calculate and characterize than a direct Eb/No estimation and since modem imperfections are impossible to separate as a source of EVM or Eb/No degradation. By using use the EVM as a discriminator for the actual modem SNR (Es/No), the received SNR can be estimated quite accurately.

A prior art technique of processing the measured EVM to estimate the SNR is described by D. J. Shin, W. Sung and I. K. Kim, "Simple SNR Methods for QPSK Modulated Short Bursts", Proc. of IEEE Global Telecommunications Conference, Globecom 2001, San Antonio, Tex., USA, vol. 6, 2001, pp. 3644-3647.

SUMMARY OF THE INVENTION

The present invention provides a method of estimating the signal-to-noise ratio of a demodulated received signal, comprising the steps of:

(a) measuring the error vector magnitude (EVM) of the demodulated signal; and (b) processing the measured EVM to provide a correction term that is a function of the measured EVM; and (c) processing the EVM in combination with the correction term to estimate the signal-to-noise ratio of the demodulated signal.

The present invention also provides a system for estimating the signal-to-noise ratio of a received modulated signal in accordance with the method of the present invention. In a preferred embodiment, this system is included in a modem for estimating the signal-to-noise ratio of a modulated signal that is received by the modem.

The present invention further provides a computer readable medium for use with a computer in such a system, wherein the computer readable medium contains program instructions for causing the computer to process the EVM in accordance with the aforesaid formula.

Additional features of the present invention are described with reference to the detailed description of the preferred embodiments.

DETAILED DESCRIPTION

Figure 1:
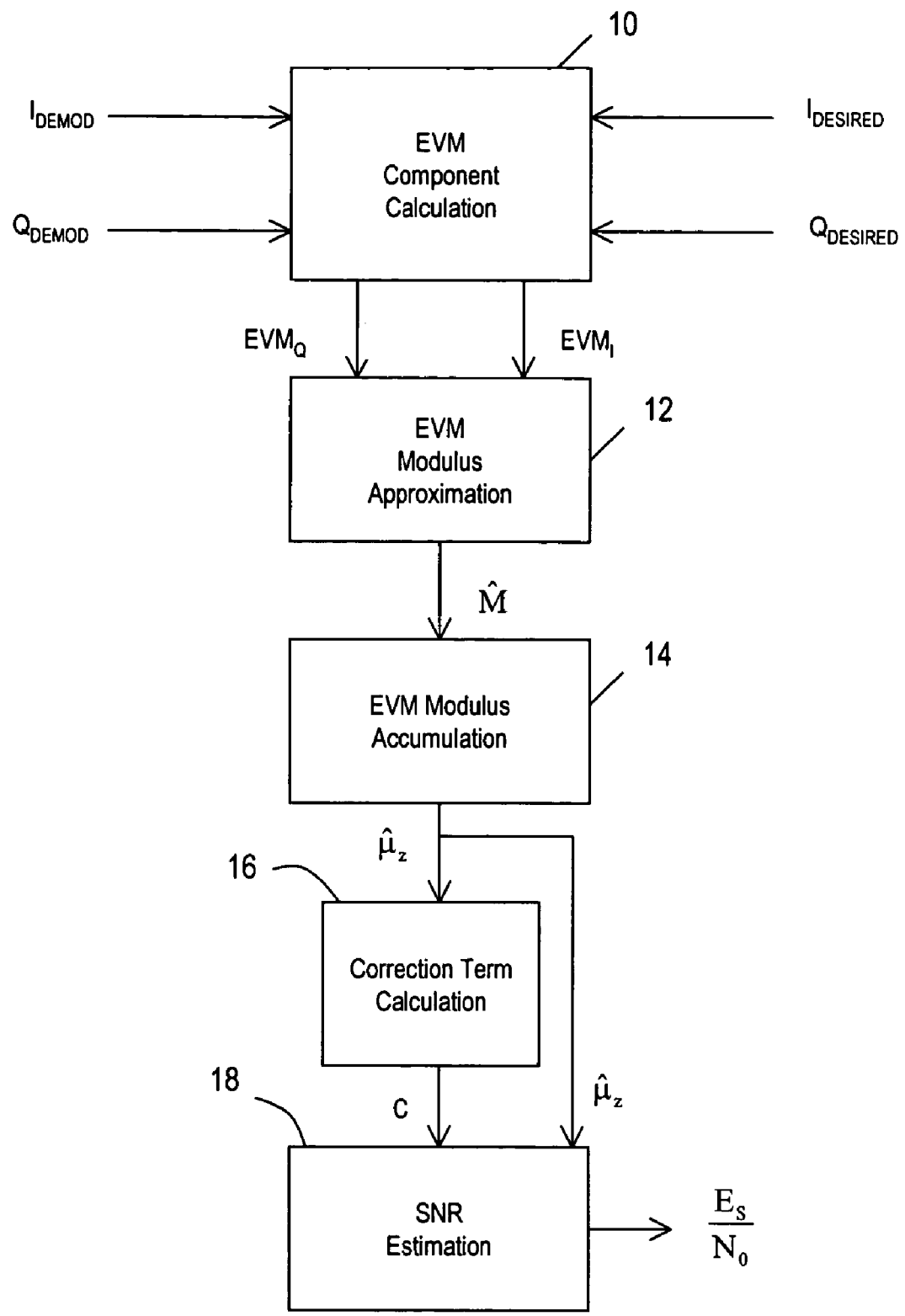
FIG. 1 is a functional block diagram of the method and system of the present invention.

Referring to FIG. 1, an EVM component calculation module 10 processes the demodulated in-phase component $I_{DEMOD}$ and the demodulated quadrature component $Q_{DEMOD}$ of the received signal in relation to the desired in-phase component $I_{DESIRED}$ and the desired quadrature component $Q_{DESIRED}$ of the received signal to calculate a measured in-phase component $EVM_I$ and a measured quadrature component $EVM_Q$.

An EVM modulus approximation module 12 processes the measured in-phase component $EVM_I$ and the measured quadrature component $EVM_Q$ to provide an approximation $\hat{M}$ of the EVM modulus.

An EVM modulus accumulation module 14 accumulates the EVM modulus approximations $\hat{M}$ by an integrate-and-dump function after accumulating a given number of symbols to provide a measured EVM value $\hat{\mu}_z$ that is used to estimate the SNR. The measured EVM value $\hat{\mu}_z$ is based on the mean of a Rayleigh density of EVM measurements. The EVM modulus accumulation module 14 is set to zero at the beginning of the accumulation cycle. In the preferred embodiment, $2^{14}$ symbols are accumulated during an accumulation cycle, and the measured EVM value $\hat{\mu}_z$ is an accumulated value rather than an averaged value. In an alternative embodiment, the measured EVM value $\hat{\mu}_z$ is an average of the accumulated value in accordance with the number of sampled symbols.

A correction term calculation module 16 processes the measured EVM value $\hat{\mu}_z$ to calculate the correction term C as a function of the measured EVM. The correction term function is based on the mean of a given density of EVM measurements. In the preferred embodiment, C is a polynomial function of $\hat{\mu}_z$.

For QPSK modulated signals, the processing means is adapted for calculating C in accordance with the formula:

$$C_{QPSK}(\hat{\mu}_z) \approx 2.71 \times 10^{-3}\hat{\mu}_z^3 - 7.54 \times 10^{-2}\hat{\mu}_z^2 + 0.7\hat{\mu}_z - 2.25. \qquad [\text{Eq. 1}]$$

For BPSK modulated signals, the processing means is adapted for calculating C in accordance with the formula:

$$C_{BPSK}(\hat{\mu}_z) \approx 1.78 \times 10^{-4}\hat{\mu}_z^3 - 1.03 \times 10^{-3}\hat{\mu}_z^2 + 4.62 \times 10^{-2}\hat{\mu}_z - 0.588. \qquad [\text{Eq. 2}]$$

An SNR estimation module 18 processes the measured EVM value $\hat{\mu}_z$ in combination with the calculated correction term C to provide an estimate $E_S/N_O$ of the SNR.

Figure 2A:
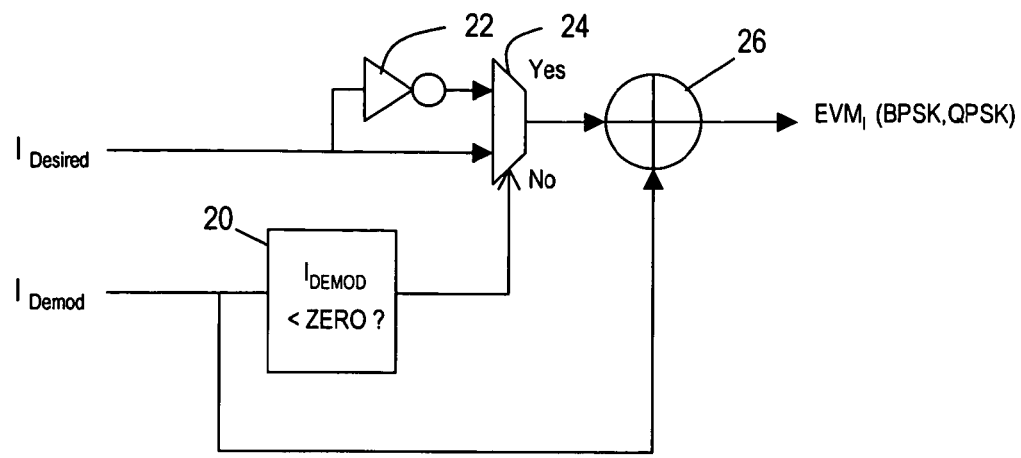
FIG. 2A is block diagram illustrating the function of calculating the in-phase component of the EVM that is performed by the EVM component calculation module shown in FIG. 1.

Referring to FIG. 2A, the EVM component calculation module 10 (shown in FIG. 1) includes a decision component 20, a signal inverter 22, a signal selection multiplexer 24 and a digital adder 26. The signal inverter 22 inverts the desired in-phase component $I_{DESIRED}$ of the received signal. Both the inverted desired in-phase component and the desired in-phase component $I_{DESIRED}$ are provided to the signal selection multiplexer 24. The decision component 24 determines whether or not the demodulated in-phase component $I_{DEMOD}$ of the EVM is greater than zero.

When it is determined that the demodulated in-phase component $I_{DEMOD}$ is greater than zero, the decision component 20 causes the signal selection multiplexer 24 to select the inverted desired in-phase component provided by the inverter 22 for input to the digital adder 26; and the digital adder adds the inverted desired in-phase component to the demodulated in-phase component $I_{DEMOD}$ to thereby calculate the measured in-phase component $EVM_I$ as the difference between the demodulated in-phase component $I_{DEMOD}$ and the desired in-phase component $I_{DESIRED}$.

When it is determined that the demodulated in-phase component $I_{DEMOD}$ is not greater than zero, the decision component 20 causes the signal selection multiplexer 24 to select the desired in-phase component $I_{DESIRED}$ provided by the inverter 22 for input to the digital adder 26; and the digital adder adds the desired in-phase component $I_{DESIRED}$ to the demodulated in-phase component $I_{DEMOD}$ to thereby calculate the measured in-phase component $EVM_I$ as the sum of the demodulated in-phase component $I_{DEMOD}$ and the desired in-phase component $I_{DESIRED}$.

The measured in-phase component $EVM_I$ is calculated as described with reference to FIG. 2A for both BPSK and QPSK/OQPSK signals.

Figure 2B:
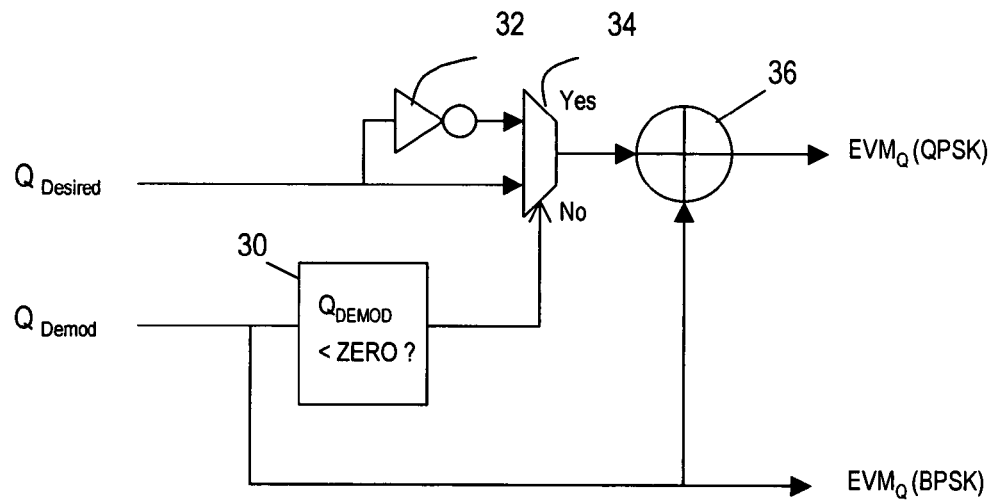
FIG. 2B is a block diagram illustrating the function of calculating the quadrature component of the EVM that is performed by the EVM component calculation module shown in FIG. 1.

Referring to FIG. 2B, the EVM component calculation module 10 also includes a decision component 30, a signal inverter 32, a signal selection multiplexer 34 and a digital adder 36. The signal inverter 32 inverts the desired quadrature component $Q_{DESIRED}$ of the received signal. Both the inverted desired quadrature component and the desired quadrature component $Q_{DESIRED}$ are provided to the signal selection multiplexer 34. The decision component 34 determines whether or not the demodulated quadrature component $Q_{DEMOD}$ of the EVM is greater than zero.

When the modulation mode is square QPSK with constellation points at the corners of a square, and it is determined that the demodulated quadrature component $Q_{DEMOD}$ is greater than zero, the decision component 30 causes the signal selection multiplexer 34 to select the inverted desired quadrature component provided by the inverter 32 for input to the digital adder 36; and the digital adder adds the inverted desired quadrature component to the demodulated quadrature component $Q_{DEMOD}$ to thereby calculate the measured quadrature component $EVM_Q$ as the difference between the demodulated quadrature component $Q_{DEMOD}$ and the desired quadrature component $Q_{DESIRED}$.

When the modulation mode is square QPSK with constellation points at the corners of a square, and it is determined that the demodulated quadrature component $Q_{DEMOD}$ is not greater than zero, the decision component 30 causes the signal selection multiplexer 34 to select the desired quadrature component $Q_{DESIRED}$ provided by the inverter 32 for input to the digital adder 36; and the digital adder 36 adds the desired quadrature component $Q_{DESIRED}$ to the demodulated quadrature component $Q_{DEMOD}$ to thereby calculate the measured quadrature component $EVM_Q$ as the sum of the demodulated quadrature component $Q_{DEMOD}$ and the desired quadrature component $Q_{DESIRED}$.

The measured quadrature component $EVM_Q$ is calculated as described with reference to FIG. 2B for only QPSK/OQPSK signals.

When the modulation mode is BPSK, the quadrature component $EVM_Q$ is measured as the demodulated quadrature component $Q_{DEMOD}$ of the received signal, as also shown in FIG. 2B.

Figure 3:
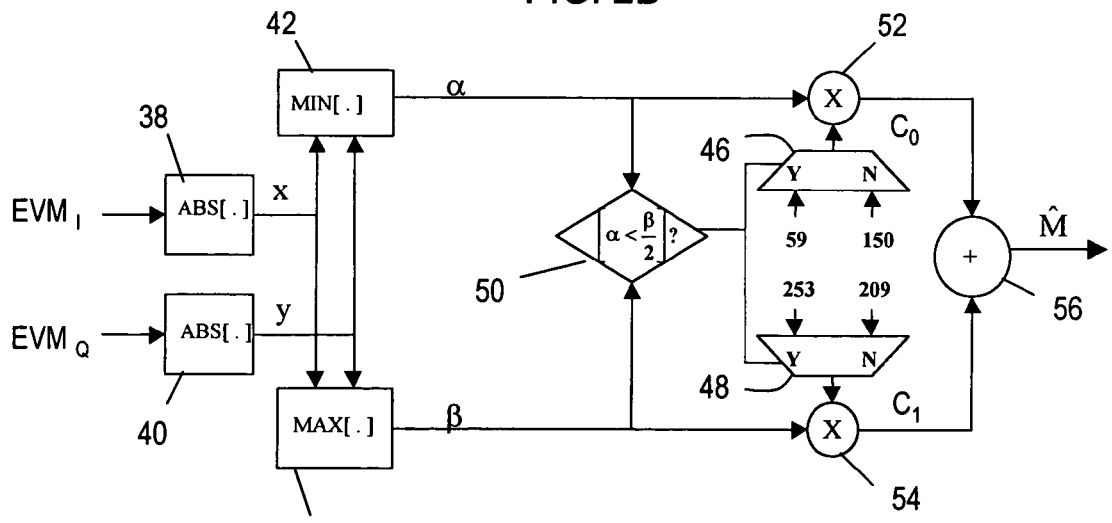
FIG. 3 illustrates a diagram of a modulus approximation algorithm performed by a preferred embodiment of the EVM modulus approximation module shown in FIG. 1.

FIG. 3 illustrates a diagram of a modulus approximation algorithm performed by a preferred embodiment of the EVM modulus approximation module 12 (shown in FIG. 1) to calculate an approximate value $\hat{M}$ of the modulus of the EVM. The modulus approximation module 12 calculates the approximate value $\hat{M}$ in accordance with:

$$\hat{M} = \text{sq root}(X^2 + Y^2) \qquad \text{[Eq. 3]}$$

wherein Y and Y are the respective absolute magnitudes of the in-phase and quadrature components $EVM_I$ and $EVM_Q$ of the measured EVM, as shown at 38 and 40 in FIG. 3.

Figure 4:
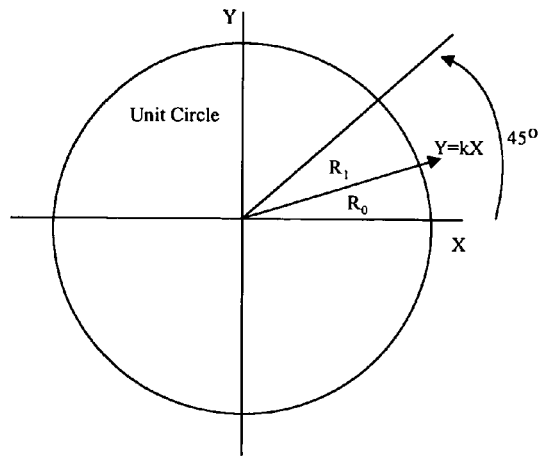
FIG. 4 shows the geometry for the modulus approximation algorithm of FIG. 3.

Referring to FIG. 4, which shows a unit circle superimposed on the X and Y axes, the modulus approximation can be made for any magnitude M without a loss of generality. Accordingly, for the purpose of explaining this approach, it is chosen that M=1. The range of the approximation may be restricted to a 45-degree wedge by utilizing the quantities:

$$\alpha = \text{Min}(|X|, |Y|) \qquad \text{[Eq. 4]}$$

and $$\beta = \text{Max}(|X|, |Y|) \qquad \text{[Eq. 5]}$$

and forming a vector $\beta\vec{i} + \alpha\vec{j}$ where the i-direction lies along the X-axis and the j-direction lies along the Y axis. Since $\alpha$ is always less than $\beta$ and the signs are always positive, the vector always forms an angle of 45 degrees or less. The magnitude of modulus $\hat{M}$ is approximated by a linear function of $\alpha$ and $\beta$:

$$\hat{M} = C_0 \alpha + C_1 \beta. \qquad \text{[Eq. 6]}$$

In FIG. 4, the 45-degree range-of-approximation wedge is divided into two regions $R_0$ and $R_1$. Different nonlinear functions are defined for M over the regions $R_0$ and $R_1$ of the wedge. This technique of approximating nonlinear functions by sets of linear functions defined over different regions is known as approximation by piecewise linear functions.

To minimize the quantity $f(M-\hat{M})$, which is an error function of the difference between the actual and approximated magnitudes of the modulus, MiniMax functions are used to provide approximate values $C_0$ and $C_1$.

A simple set of regions is given by defining $R_0$ from Y=0 to Y=½X, and, $R_1$ from Y=½X to Y=X. The following system of equations is thereby applicable:

$$\text{Over } R_0: \text{Find:} \qquad \text{[Eq. 7]}$$
$$\{C_{0R_0}, C_{1R_0}\} = \text{Min}\{\text{Max}[|1 - C_{0R_0}\sin\phi - C_{1R_0}\cos\phi|]\} \forall \{\phi\} \in R_0$$

$$\text{Over } R_1: \text{Find: } \{C_{0R_1}, C_{1R_1}\} = \qquad \text{[Eq. 8]}$$
$$\text{Min}\{\text{Max}[|1 - C_{0R_1}\sin\phi - C_{1R_1}\cos\phi|]\} \forall \{\phi\} \in R_1$$

For M=1, the above equations are solved by using the MiniMax error function in an optimization toolbox in MATLAB:

$$\text{Over } R_0\left\{\alpha < \frac{\beta}{2}\right\}: \hat{M} = 0.232\alpha + 0.9865\beta \qquad \text{[Eq. 9]}$$

$$\text{Over } R_1\left\{\alpha \geq \frac{\beta}{2}\right\}: \hat{M} = 0.588\alpha + 0.817\beta \qquad \text{[Eq. 10]}$$

The actual values of the coefficients indicated in Equations 7 and 8 that are used in the physical implementation of the preferred embodiment are fixed point values that are represented as integer values and are determined by scaling the floating point values by an integer power of two and either rounding or truncating the result to realize the implemented coefficients shown in FIG. 3.

Referring again to the diagram of the magnitude approximation algorithm shown in FIG. 3, it is seen that the values of α and β are provided in accordance with Equations 4 and 5 by using MiniMax functions, as shown at 42 and 44; and that the respective values of the coefficients $C_0$ and $C_1$ by which α and β are multiplied in Equation 6 are provided in accordance with Equations 9 and 10.

The respective values of the coefficients $C_0$ and $C_1$ are provided by selection multiplexers 46, 48 in response to a determination by a decision component 50 as to whether or not α<β/2. A first digital multiplier 52 multiplies the value of α by the selected coefficient $C_0$ and a second digital multiplier 54 multiplies the value of β by the selected coefficient $C_1$. The outputs of the two digital multipliers 52, 54 are summed by a digital adder 56 to provide the approximate value $\hat{M}$ of the modulus.

The coefficients $C_0$ and $C_1$ are 8-bit unsigned two's complement numbers and each multiplication by the digital multipliers 52, 54 is followed by a rounding down of the eight LSBs. The magnitude approximation module 12 uses rounding and truncation in performing the magnitude approximation algorithm shown in FIG. 3. This algorithm is very sensitive to quantization. Magnitude values are used rather than power values in order to conserve on the number of bits used in the subsequent detection processing.

Figure 5:
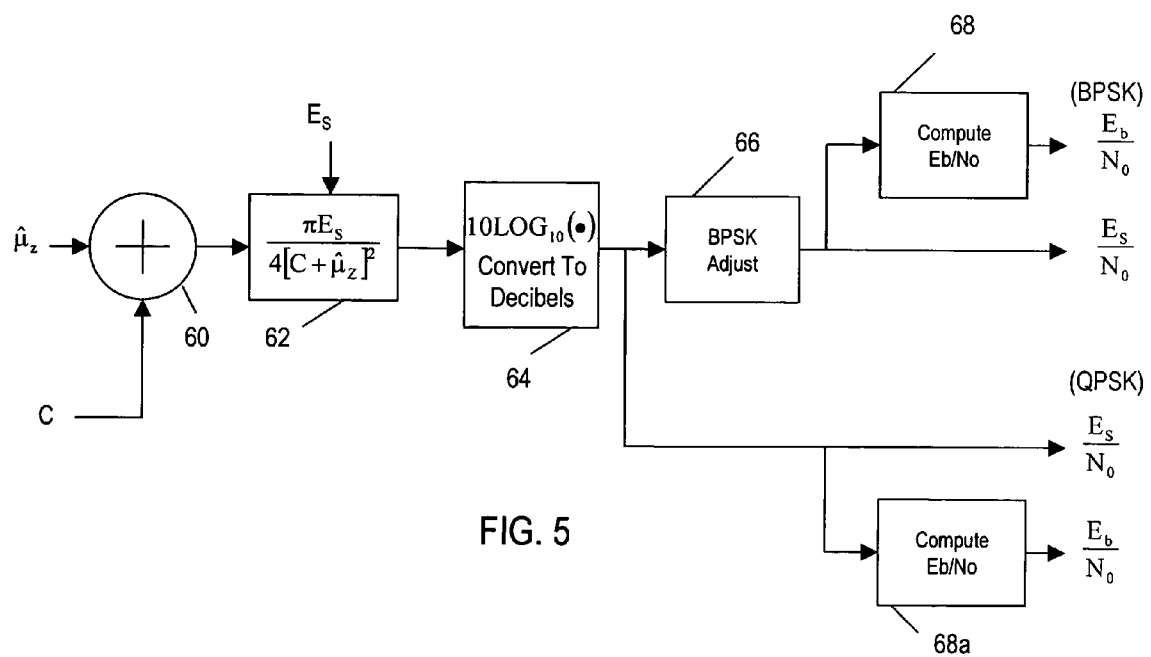
FIG. 5 is a block diagram illustrating the functions of the SNR estimation module shown in FIG. 1.

Referring to FIG. 5, the SNR estimation module 18 (shown in FIG. 1) includes a digital adder 60, a computation component 62, a decibels conversion component 64, a BPSK adjustment unit 66, a first $E_b/N_o$ adjustment unit 68 and a second $E_b/N_o$ adjustment unit 68a.

The digital adder 60 adds the value of the correction term C to the value $\hat{\mu}_z$ of the measured EVM; and the computation component processes the sum $C+\hat{\mu}_z$ with the desired modulus $E_S$ of the received signal in the symbol domain to estimate the SNR in accordance with the formula:

$$\frac{E_S}{N_0} \cong \left( \frac{\pi \cdot \lceil E_S \rceil}{4[\hat{\mu}_z + C(\hat{\mu}_z)]^2} \right) \quad \text{[Eq. 11]}$$

$E_S$ is proportional to the desired power of the received signal, which is estimated by squaring the desired received signal amplitude. $N_0$ is the noise power spectral density.

The estimated value of the SNR provided by the computation component 62 is converted to decibels by the conversion component 64 to thereby provide an estimated SNR expressed in decibels in accordance with the formula:

$$\frac{E_S}{N_0} \cong 10 \cdot \text{LOG}_{10} \left( \frac{\pi \cdot \lceil E_S \rceil}{4[\hat{\mu}_z + C(\hat{\mu}_z)]^2} \right) \text{(dB)} \quad \text{[Eq. 12]}$$

For BPSK modulated signals, the BPSK adjustment unit 66 adjusts the output of the decibels conversion component 64 for low estimated values of $E_S/N_O$ as follows: When the output of the conversion component 64 is less than 2 decibels, the BPSK adjustment unit 66 adjusts the output of the conversion component 64 by minus 1.2 decibels. When the output of the conversion component 64 is less than 3 decibels and not less than 2 decibels, the BPSK adjustment unit 66 adjusts the output of the conversion component 64 by minus 0.6 decibels. When the output of the conversion component 64 is less than 3.5 decibels and not less than 3 decibels, the BPSK adjustment unit 66 adjusts the output of the conversion component 64 by minus 0.4 decibels. For example, if the output of the conversion component 64 is 2.5 decibels, the output of the BPSK adjustment unit 66 is minus 1.9 decibels.

Each $E_b/N_o$ adjustment unit 68, 68a, provides an alternative estimated value of the SNR by processing the respective $E_s/N_o$ input signal in accordance with the formula:

$$E_b/N_o = E_s/N_o - 10 \text{ LOG}_{10}\{\# \text{ bits/symbol}\} + 10 \text{ LOG}_{10}(R) \text{ (db)} \quad \text{[Eq. 13]}.$$

R is the code rate when forward error correction is used.

In various alternative embodiments, one or more of the decibels conversion component 64, the BPSK adjustment unit 66, the first $E_b/N_o$ adjustment unit 68 and the second $E_b/N_o$ adjustment unit 68a may be omitted from the SNR estimation module 18 in accordance with the particular type of SNR estimation that is desired and/or the particular modulation of the received signal.

The system of the present invention is implemented in a computer, such as a digital signal processor. A computer readable medium, which is provided for use with the computer, contains program instructions for causing the computer to process the EVM in accordance with the formulas and equations described herein.

In one preferred embodiment, the SNR estimation system of the present invention is included in a modem (not shown) for estimating the SNR of a received signal that is demodulated by the modem.

Figure 6:
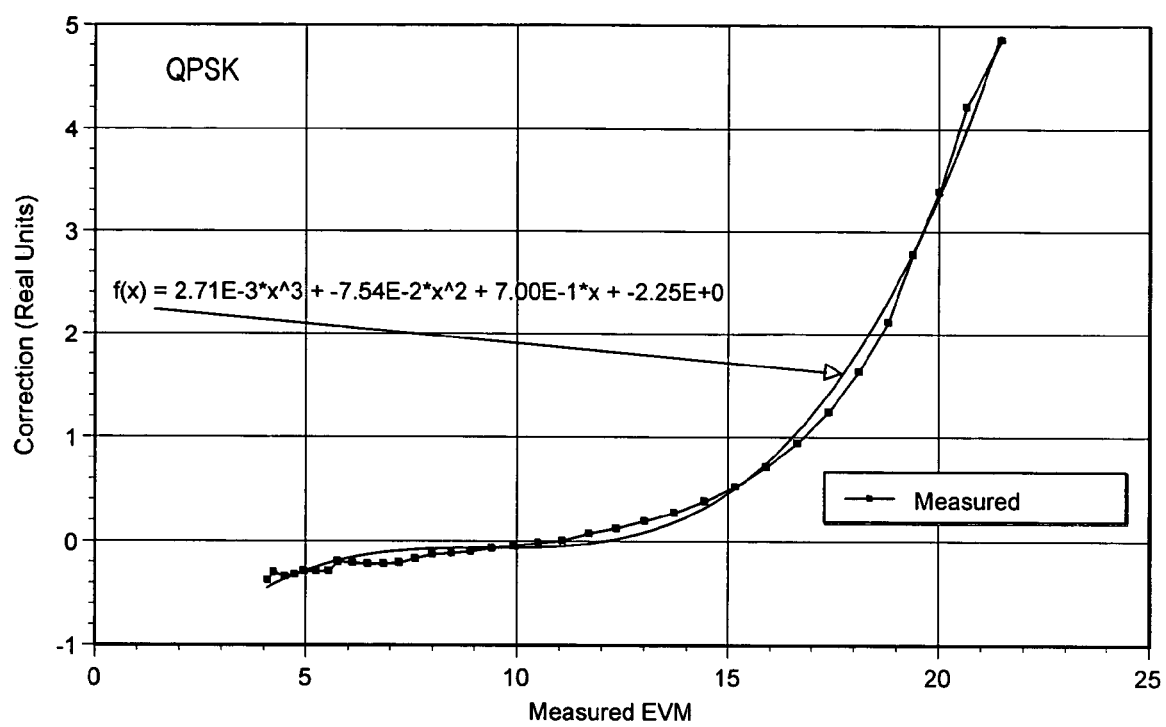
FIG. 6 provides a first curve based on measured simulation data showing the correction term required to estimate a known SNR when using the method and system of the present invention for each of several different measured EVM values, and a second curve of the correction term as a function the measured EVM. The curves shown in FIG. 6 are for demodulated QPSK/OQPSK signals.

FIG. 6 provides a first graph based on measured simulation data showing the correction term required to estimate a known SNR when using the method and system of the present invention for each of several different measured EVM values, and a second graph showing the correction term as a function the measured EVM. The graphs shown in FIG. 6 are for demodulated QPSK/OQPSK signals.

FIG. 6 includes a first curve based on measured simulation data showing the correction term required to estimate a known SNR when using the method and system of the present invention for each of several different plotted measured EVM values $\hat{\mu}_z$. During test simulations of the method and system of the present invention, an estimated value of the SNR was computed in accordance with Equation 12 for different correction term values by the computation component 62 and the decibels conversion component 64 of SNR estimator shown in FIG. 5. Simulations were conducted for each of the plotted measured EVM values $\hat{\mu}_z$ to ascertain the correction term required in order to cause the estimated value of the SNR computed in accordance with Equation 12 to match the known SNR corresponding to the measured EVM. The measurements were made at a threshold in a range of 3 dB Es/No to 20 dB in increments of 0.5 dB.

FIG. 6 also includes a second curve, which is a curve of the correction term as a least-squares polynomial function of the measured EVM. The curves shown in FIG. 6 are for demodulated QPSK/OQPSK signals. The polynomial function for the second curve is set forth in Equation 1, which was derived to approximately fit the second curve to the first curve derived from the simulation data.

Figure 7:
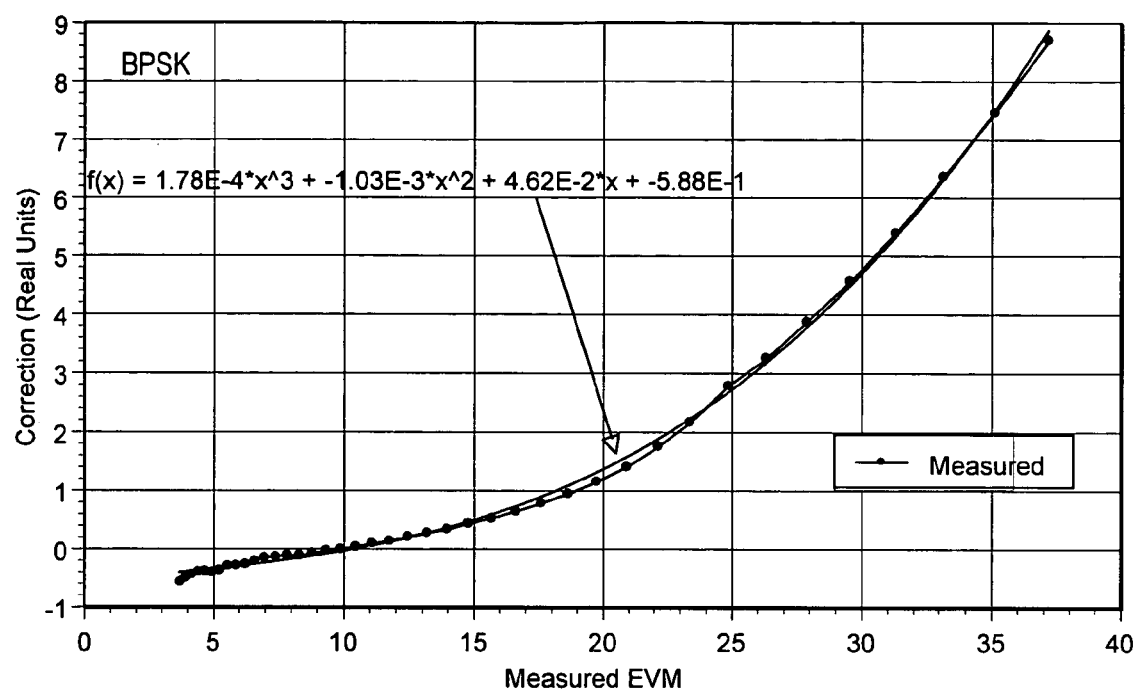
FIG. 7 provides the same types of curves as those shown in FIG. 6, except that the curves shown in FIG. 7 are for demodulated BPSK signals

FIG. 7 includes the same types of curves as those shown in FIG. 6, except that the curves shown in FIG. 7 are for demodulated BPSK signals. The polynomial function for the second curve shown in FIG. 7 is set forth in Equation 2.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of estimating the signal-to-noise ratio of a demodulated received signal, comprising the steps of:
   (a) measuring the error vector magnitude (EVM) of the demodulated signal;
   (b) processing the measured EVM to provide a correction term that is a function of the measured EVM; and
   (c) processing the EVM in combination with the correction term to estimate the signal-to-noise ratio of the demodulated signal.

2. A method according to claim 1, wherein step (c) comprises the step of:
   (d) processing the measured EVM in accordance with the formula:

$$\frac{E_S}{N_0} \cong \left( \frac{\pi \cdot \lceil E_S \rceil}{4[\hat{\mu}_z + C(\hat{\mu}_z)]^2} \right)$$

wherein $E_S$ is proportional to the desired power of the received signal, which is estimated by squaring the desired received signal amplitude, $N_0$ is noise power spectral density, $\hat{\mu}_z$ is the measured EVM and C is the correction term.

3. A method according to claim 2, wherein $\hat{\mu}_z$ is based on the mean of a given density of EVM measurements.

4. A method according to claim 2, wherein $\hat{\mu}_z$ is based on the mean of a Rayleigh density of EVM measurements.

5. A method according to claim 2, wherein C is a polynomial.

6. A method according to claim 5, wherein for QPSK modulated signals, C is calculated in accordance with the formula:

$$C_{QPSK}(\hat{\mu}_z) \cong 2.71 \times 10^{-3} \hat{\mu}_z^3 - 7.54 \times 10^{-2} \hat{\mu}_z^2 + 0.7 \hat{\mu}_z - 2.25.$$

7. A method according to claim 5, wherein for BPSK modulated signals, C is calculated in accordance with the formula:

$$C_{BPSK}(\hat{\mu}_z) \cong 1.78 \times 10^{-4} \hat{\mu}_z^3 - 1.03 \times 10^{-3} \hat{\mu}_z^2 + 4.62 \times 10^{-2} \hat{\mu}_z - 0.588.$$

8. A method according to claim 1, wherein step (a) comprises the steps of:
   (d) when the demodulated in-phase component is greater than zero, measuring the in-phase component of the EVM as the difference between the demodulated and desired in-phase components of the received signal;
   (e) when the demodulated in-phase component is not greater than zero, measuring the in-phase component of the EVM as the sum of the demodulated and desired in-phase components of the received signal;
   (f) when the modulation mode is square QPSK with constellation points at the corners of a square and said demodulated quadrature component is greater than zero, measuring the quadrature component of the EVM as the difference between the demodulated and desired quadrature components of the received signal;
   (g) when the modulation mode is square QPSK with constellation points at the corners of a square and said demodulated quadrature component is not greater than zero, measuring the quadrature component of the EVM as the sum of the demodulated and desired quadrature components of the received signal; and
   (h) when the modulation mode is BPSK with constellation points at 0 degrees and 180 degrees, measuring the quadrature component of the EVM as the demodulated quadrature component of the received signal.

9. A system for estimating the signal-to-noise ratio of a demodulated received modulated signal, comprising:
   means for measuring the error vector magnitude (EVM) of the demodulated signal; and
   first means for processing the measured EVM to provide a correction term that is a function of the measured EVM;
   second means for processing the EVM in combination with the correction term to estimate the signal-to-noise ratio of the demodulated signal.

10. A system according to claim 9, wherein the second means are adapted for estimating the signal-to-noise ratio in accordance with the formula:

$$\frac{E_S}{N_0} \cong \left( \frac{\pi \cdot \lceil E_S \rceil}{4[\hat{\mu}_z + C(\hat{\mu}_z)]^2} \right)$$

wherein $E_S$ is proportional to the desired power of the received signal, which is estimated by squaring the desired received signal amplitude, $N_0$ is noise power spectral density, $\hat{\mu}_z$ is the measured EVM and C is the correction term.

11. A system according to claim 10, wherein $\hat{\mu}_z$ is based on the mean of a given density of EVM measurements.

12. A system according to claim 10, wherein $\hat{\mu}_z$ is based on the mean of a Rayleigh density of EVM measurements.

13. A system according to claim 10, wherein C is a polynomial.

14. A system according to claim 13, wherein for QPSK modulated signals, the processing means is adapted for calculating C in accordance with the formula:

$$C_{QPSK}(\hat{\mu}_z) \cong 2.71 \times 10^{-3} \hat{\mu}_z^3 - 7.54 \times 10^{-2} \hat{\mu}_z^2 + 0.7 \hat{\mu}_z - 2.25.$$

15. A system according to claim 13, wherein for BPSK modulated signals, the processing means is adapted for calculating C in accordance with the formula:

$$C_{BPSK}(\hat{\mu}_z) \cong 1.78 \times 10^{-4} \hat{\mu}_z^3 - 1.03 \times 10^{-3} \hat{\mu}_z^2 + 4.62 \times 10^{-2} \hat{\mu}_z - 0.588.$$

16. A system according to claim 9, wherein the measuring means is adapted for:
   (a) measuring the in-phase component of the EVM as the difference between the demodulated and desired in-phase components of the received signal when the demodulated in-phase component is greater than zero;
   (b) measuring the in-phase component of the EVM as the sum of the demodulated and desired in-phase components of the received signal when the demodulated in-phase component is not greater than zero;

(c) measuring the quadrature component of the EVM as the difference between the demodulated and desired quadrature components of the received signal when the modulation mode is square QPSK with constellation points at the corners of a square and said demodulated quadrature component is greater than zero;

(d) measuring the quadrature component of the EVM as the sum of the demodulated and desired quadrature components of the received signal when the modulation mode is square QPSK with constellation points at the corners of a square and said demodulated quadrature component is not greater than zero; and (e) measuring the quadrature component of the EVM as the demodulated quadrature component of the received signal when the modulation mode is BPSK with constellation points at 0 degrees and 180 degrees.

17. A system according to claim 9, wherein the system is included in a modem for estimating the signal-to-noise ratio of a received signal that is demodulated by the modem.

18. A computer readable medium for use with a computer in a system for estimating the signal-to-noise ratio of a received modulated signal, said system comprising: means for measuring the error vector magnitude (EVM) of the received signal; and means for processing the EVM to estimate the signal-to-noise ratio of the received signal;

wherein the computer readable medium contains program instructions for causing the computer to process the measured EVM to provide a correction term that is a function of the measured EVM; and to process the EVM in combination with the correction term to estimate the signal-to-noise ratio of the demodulated signal.

19. A computer readable medium according to claim 18, wherein the computer readable medium contains program instructions for causing the computer to estimate the EVM in accordance with the formula:

$$\frac{E_S}{N_0} \cong \left( \frac{\pi \cdot \lceil E_S \rceil}{4[\hat{\mu}_z + C(\hat{\mu}_z)]^2} \right)$$

wherein $E_S$ is proportional to the desired power of the received signal, which is estimated by squaring the desired received signal amplitude, $N_0$ is noise power spectral density, $\hat{\mu}_z$ is the measured EVM and C is the correction term.

20. A computer readable medium according to claim 19, wherein $\hat{\mu}_z$ is based on the mean of a given density of EVM measurements.

21. A computer readable medium according to claim 19, wherein $\hat{\mu}_z$ is based on the mean of a Rayleigh density of EVM measurements.

22. A computer readable medium according to claim 19, wherein C is a polynomial.

23. A computer readable medium according to claim 22, wherein for QPSK modulated signals, C is calculated in accordance with the formula:

$$C_{QPSK}(\hat{\mu}_z) \cong 2.71 \times 10^{-3} \hat{\mu}_z^3 - 7.54 \times 10^{-2} \hat{\mu}_z^2 + 0.7 \hat{\mu}_z - 2.25.$$

24. A computer readable medium according to claim 22, wherein for BPSK modulated signals, C is calculated in accordance with the formula:

$$C_{BPSK}(\hat{\mu}_z) \cong 1.78 \times 10^{-4} \hat{\mu}_z^3 - 1.03 \times 10^{-3} \hat{\mu}_z^2 + 4.62 \times 10^{-2} \hat{\mu}_z - 0.588.$$

* * * * *